(12) United States Patent
Phillips (10) Patent No.: US 8,725,222 B2
(45) Date of Patent: May 13, 2014

(54) PAYMENT-ENABLED MOBILE TELEPHONE ASSEMBLY

(75) Inventor: Simon Phillips, York (GB)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/292,390

(22) Filed: Nov. 9, 2011

(65) Prior Publication Data

US 2012/0122520 A1     May 17, 2012

Related U.S. Application Data

(60) Provisional application No. 61/412,526, filed on Nov. 11, 2010.

(51) Int. Cl.
*H04M 1/00*     (2006.01)

(52) U.S. Cl.
USPC .............. 455/575.1; 455/575.5; 455/558; 455/556.1

(58) Field of Classification Search
USPC .................. 455/557, 575.1, 558, 556.1
See application file for complete search history.

(56) References Cited

U.S. PATENT DOCUMENTS

| | | | |
|---|---|---|---|
| 7,861,931 B2 | 1/2011 | Phillips | |
| 7,865,214 B2 * | 1/2011 | Kushima | 455/562.1 |
| 7,949,373 B2 * | 5/2011 | Whiting | 455/557 |
| 8,261,997 B2 * | 9/2012 | Gebhart | 235/492 |
| 2009/0026277 A1 | 1/2009 | Phillips | |
| 2010/0093412 A1 * | 4/2010 | Serra et al. | 455/575.8 |
| 2010/0182764 A1 | 7/2010 | Phillips | |

* cited by examiner

*Primary Examiner* — Olumide T Ajibade Akonai
*Assistant Examiner* — Randy Peaches
(74) *Attorney, Agent, or Firm* — Buckley, Maschoff & Talwalkar LLC (57) ABSTRACT

A payment-enabled mobile device assembly includes a carrying case configured for attachment to a portable electronic device and that includes an aperture for accepting an integrated circuit (IC) identification card. The IC identification card has a card body and includes electronic components, and in some embodiments a shield layer is provided to shield the electronic components of the IC identification card from electronic components of the portable electronic device. In addition, when the IC identification card is inserted into the aperture at least a portion of the front surface is visible through the aperture.

12 Claims, 5 Drawing Sheets

PAYMENT-ENABLED MOBILE TELEPHONE ASSEMBLY

CROSS-REFERENCE TO RELATED APPLICATIONS

The present application is based on, and claims benefit and priority of, U.S. Provisional Patent Application No. 61/412,526 filed on Nov. 11, 2010, the contents of which are incorporated herein in their entirety for all purposes.

BACKGROUND

It is well known to provide contactless payment cards in the standard ID-1 geometry (substantially 85.6×54 mm in planar extent). Such cards resemble conventional credit and debit cards in size and shape, and allow account holders to access debit or credit card accounts to pay for transactions by wireless communication between the contactless payment cards and proximity readers included in point of sale (POS) terminals.

Because of the wireless communication capability of these cards, it is feasible to enhance their convenience by shrinking their size, to perhaps one-half or one-third or less of the planar extent of the standard ID-1 geometry. In this reduced size, a contactless payment card may be carried, for example, as a fob on a key ring.

According to certain proposals, it has been suggested that small contactless payment cards be integrated with portable handheld electronic devices such as mobile telephones. In one such proposal, the housing of a mobile telephone is configured to include one or more slots shaped and sized to receive small contactless payment cards. However, this approach requires coordination and cooperation with manufacturers of mobile telephones and/or with mobile telephone network operators. In practice, it may be difficult to achieve such coordination and cooperation. Also, if a slot or slots of a certain size are included in the mobile telephone housing, small contactless cards of other sizes would not be compatible with the mobile telephone. Still further, there may be significant added cost in modifying the mobile telephone design to accommodate contactless card slots.

In another prior art proposal, an adhesive layer is added to the rear of a contactless payment card, which may take the form of a somewhat flexible self-adhesive label. The card/label can then be adhered to the rear surface of a mobile telephone. One disadvantage with this approach may arise if the account holder wishes to replace the mobile telephone after attaching the payment card/label thereto. It may be difficult to remove the card/label from the mobile telephone housing, and it may be impossible or impractical to attach the card/label to the cardholder's new mobile telephone. Also, if the account holder desires to change payment cards, the problem of removing the card/label from the mobile telephone housing again arises, and such removal may leave an adhesive residue on the mobile telephone housing or otherwise mar the finish of the mobile telephone housing. Still another disadvantage may arise if the account holder wishes to temporarily lend his/her mobile telephone to another individual, but does not wish to entrust his/her payment card to the individual.

Another possible disadvantage of the latter approach is that the layer of adhesive material on the card/label and/or the flexibility of the card/label may make it difficult to perform personalization processing on the card/label with conventional personalization equipment. Consequently, the cost of personalizing the card/label may be increased.

The present inventor, in a prior application filed Jul. 27, 2007 and published as U.S. Published Application No. 2009/0026277 ("the '277 publication"), disclosed a holder for a contactless identification card. The holder is in the form of a sticker that may be adhered to a portable electronic device. The holder may include a slot or pouch in which the contactless identification card may be inserted to removably secure the contactless identification card to the electronic device. The '277 publication is assigned to the assignee of the present application and is incorporated herein by reference.

In addition, the present inventor, in another prior application filed on Jan. 20, 2009 and published as U.S. Published Application No. 2010/0182764 ("the '764 publication), disclosed a carrying case for a portable device, where the case includes a slot in which a small contactless ID card may be inserted to secure the card to the portable device. The '764 publication is assigned to the assignee of the present application and is also incorporated herein by reference.

The inventor recognized that it would be desirable to provide further techniques and assemblies for securing contactless identification cards to electronic devices that are low cost, simple to use, and more robust than prior techniques.

BRIEF DESCRIPTION OF THE DRAWINGS

Features and advantages of some embodiments of the present invention, and the manner in which the same are accomplished, will become more readily apparent upon consideration of the following detailed description taken in conjunction with the accompanying drawings which illustrate exemplary embodiments and which are not necessarily drawn to scale, wherein.

DETAILED DESCRIPTION

In general, and for the purpose of introducing concepts of the embodiments of the present identification card and mobile device assembly, a removable carrying case or holder or accessory may be fitted to a portable electronic handheld device such as a mobile telephone. The removable carrying case or holder may contain an aperture that is sized and shaped to hold the identification card securely therein. In some embodiments, the identification card is an integrated circuit (IC) subcard, and it is inserted into the aperture such that, when the carrying device is fitted to the mobile device the identification card is seated in the aperture and sandwiched between the carrying case and the mobile device. When seated in such manner in the aperture of the carrying case, a shield layer (which may be incorporated into the subcard or identification card near a back surface thereof) faces the mobile device and functions as a shield to protect active components, for example an integrated circuit and antenna of the identification card, from any emissions that a battery and/or other electronic circuitry that may be housed within the mobile device. In the absence of a shield layer, such emissions from the mobile device may interfere with the identification card, for example, when the identification card is attempting to communicate with a proximity reader. In addition, according to aspects described below, a brand name or other information that may be printed on a front surface of the identification card may be visible through the aperture in the carrying case when the identification card is seated therein.

Such an identification card and mobile device assembly is advantageous because consumers can easily understand how it works, and thus when provided with the carrying case and an identification card the consumer can easily insert the card into the carrying case with little or no instruction. In particular, the aperture provides a fixed location within the carrying case for the card so that any positioning errors while inserting the identification card are minimized. Furthermore, such a carrying case can be customized to provide an aperture that fits one or more identification card profiles, and that serves to protect the consumer's mobile device while conveniently housing the identification card in a position for quick and easy use at, for example, a point of sale (POS) device (which will be explained below). Yet further, the structure of the carrying case permits payment card branding and/or other branding information printed or otherwise present on the identification card to be visibly displayed, which helps to promote strong card issuer brand presence in the market. Moreover, such an assembly is portable and more robust than using a sticker or adhesive to attach the identification card to the mobile device, and will not damage or otherwise mar the casing of the mobile device.

Such a carrying case and identification card holder assembly may advantageously be utilized as a low cost promotional item by a marketer or an issuer financial institution to, for example, give away to entice a consumer to open a new payment card account. For example, the carrying case may be customized to fit an "iPhone 4S" manufactured by Apple Inc., or any number of mobile telephones manufactured by other companies such as Motorola, Samsung and HTG, and an issuer bank may offer such a carrying case to consumers at no cost if and/or when a consumer opens a new proximity payment card account with that issuer bank. Thus, the consumer may be provided with a "free" carrying case that protects their mobile device and that houses their identification card (payment card).

Figure 1A:
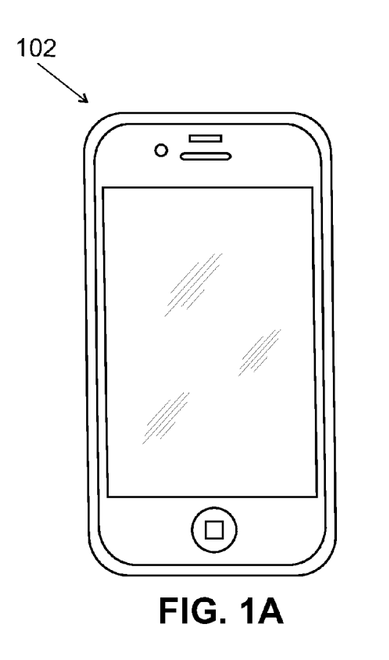
FIGS. 1A to 1C illustrate components of a payment-enabled mobile device assembly as provided in accordance with aspects of the present invention.
Figure 1B:
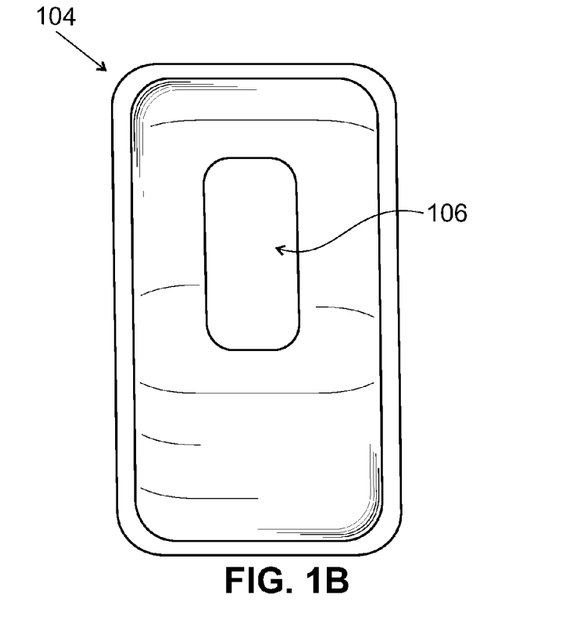
Figure 1C:
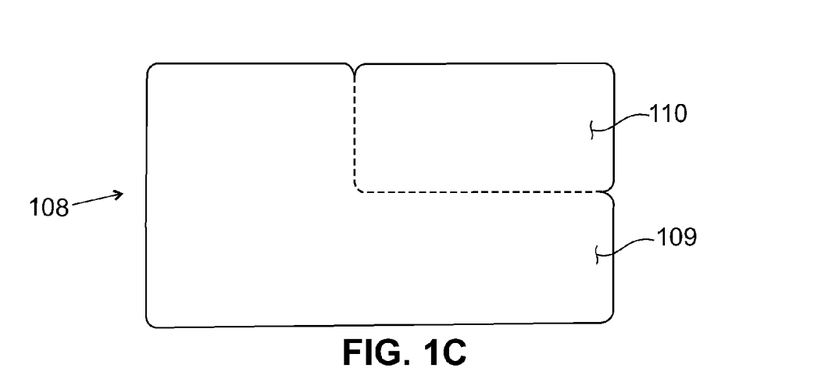

FIGS. 1A to 1C illustrate components 100 of a payment-enabled mobile device assembly as provided in accordance with aspects of the present invention. In particular, FIG. 1A depicts a conventional mobile telephone 102 such as the well-known "iPhone™" from Apple Inc., FIG. 1B illustrates a carrying case 104 for the mobile device 102, and FIG. 1C illustrates a carrier/subcard assembly 108. In some embodiments, instead of a mobile telephone 102, another type of portable electronic device may be employed, such as a portable music player (such as an iPod™) or a portable digital assistant (PDA). The mobile telephone or portable electronic device may be entirely conventional. For the most part hereinafter the device will be referred to as "mobile telephone 102".

Referring again to FIG. 1B, the carrying case 104 may be mainly conventional, and may be made of a plastic, rubber, composite, or other durable material. However, the carrying case includes an aperture 106 through its rear surface to allow for reading printed information from, for example, a contactless ID card that is to be secured within the case 104. The carrier/subcard assembly 108 of FIG. 1C may be quite similar to the carrier/subcard assembly shown in U.S. Pat. No. 7,861,931 (see FIGS. 1 and 2), which is assigned to the assignee of the present application and which is incorporated herein by reference. In particular, the carrier/subcard assembly 108 may include a card carrier 109 and a proximity payment device or subcard 110 in a generally rectangular card-shaped plastic body that may be formed of any material conventionally used to make payment cards, identity cards, proximity payment devices, and the like.

Figure 2:
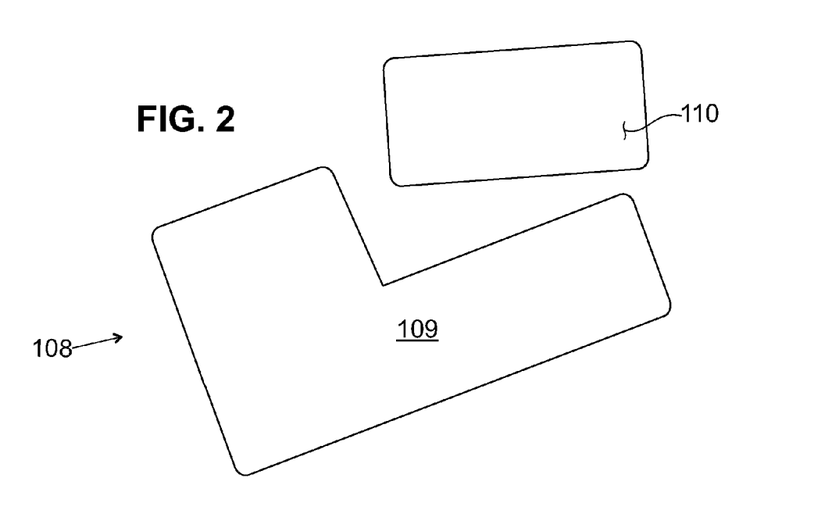
FIG. 2 shows a small contactless ID card (a "subcard") detached from a larger carrier card.

FIG. 2 shows the contactless ID card 110 after having been detached or snapped-off or otherwise separated from the carrier card 109. In some embodiments, the contactless ID card 110 (which is also known as a "subcard") is a payment card. It should be understood, however, that the identification card or contactless ID card 110 may identify the individual who holds the card for purposes other than, or in addition to, payment transactions. For example, the identification card 110 may be a transit system access card, a retail merchant customer loyalty card, a gym membership card, a building or office suite access card, and the like. The identification card 110 may also be configured to perform multiple or a combination of functions, for example, it may be configured to act as a proximity payment card and as a transit system access card. Again, however, for ease of understanding, for the most part hereinafter the identification card 110 will be referred to as "contactless payment card 110".

In some embodiments, the contactless payment card 110 may be substantially smaller, in planar extent, than the dimensions called for by the ID-1 standard. (For the purposes of this disclosure and the appended claims, the "planar extent" of an object refers to the area occupied by the object in the main plane of the object. Thus the "planar extent" of an ID-1 card is substantially 85.6×54 mm.) For example, the planar extent of the contactless payment card 110 may be one-half, one-third, one-quarter or less (or another fraction or percentage), of the planar extent of an ID-1 card. For example, the contactless payment card 110 may have a length that is substantially equal to the width (approximately 54 mm) of an ID-1 card, while having a width that is perhaps one-third to one-fifth the length (approximately 86 mm) of the ID-1 card. Thus, for example, the contactless payment card 110 (or subcard) may have a planar extent of 52×25 mm.

Figure 3:
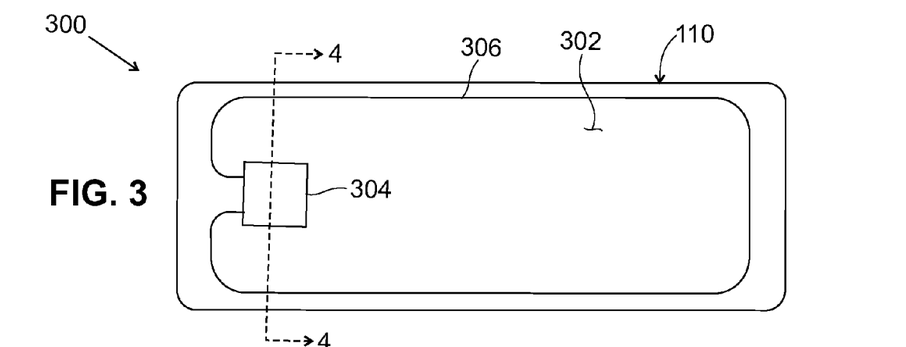
FIG. 3 is a schematic plan view of an example of the subcard seen in FIG. 2.

FIG. 3 is a schematic plan view 300 of an example of the active components of the contactless payment card 110. In this embodiment, the contactless payment card 110 includes a card-shaped body 302 (e.g., laminated from layers of plastic) in which an RFID (radio frequency identification) chip 304 (integrated circuit or IC) is embedded. An antenna 306 is also embedded in the card-shaped body 302 and may be configured to run along the periphery of the card-shaped body 302, as shown. The antenna 306 is coupled to the RFID chip 304 to allow the RFID chip 304 to receive interrogation signals, for example, from proximity reader devices included in POS terminals. The antenna 306 also allows the RFID chip to transmit payment card account information and/or other information or data to such proximity readers that may be associated with the POS terminals (or to other types of transceivers). The contactless payment card 110 may be constructed and may operate generally in accordance with conventional practices.

For purposes of illustration, the RFID chip 304 and antenna 306 are shown in FIG. 3, but in practical examples of the contactless payment card 110 the card body may be formed largely of opaque plastic and the RFID chip and antenna may be embedded in the opaque plastic so as not to be visible. In such cases, a front or top surface of the contactless payment card 110 may include printed material, for example branding information, such as one or more logos of an issuing bank (or Issuer financial institution that issued the payment card account) and of a payment card association (such as MasterCard™). Other information may also be printed on the front surface of the payment card 110 for display, such as an account number and the name of the account holder that is specific to that particular payment card. In other embodiments, different information, such as the name of a transit system or a merchant's retail store, may be printed on the top surface of the identification card 110.

Those who are skilled in the art are aware of a process known as "personalizing" a payment card. In some embodiments, during a personalization process card specific information is wirelessly written into the card's RFID chip, and in some embodiments may also be printed on the top surface of the card. In accordance with prior proposals, the process of personalization may be simplified by initially providing the card blank as part of an ID-1 sized assembly that includes scoring or the like to define the card within the ID-1 sized footprint of the card assembly. The ID-1 sized card assembly may then be processed for purposes of personalizing the card blank using the same standard types of personalization equipment conventionally used to personalize ID-1 sized contactless payment cards. For example, in some embodiments the carrier card 109 and subcard 110 assembly shown in FIGS. 1C and 2 is an ID-1 sized card assembly.

Figure 4:
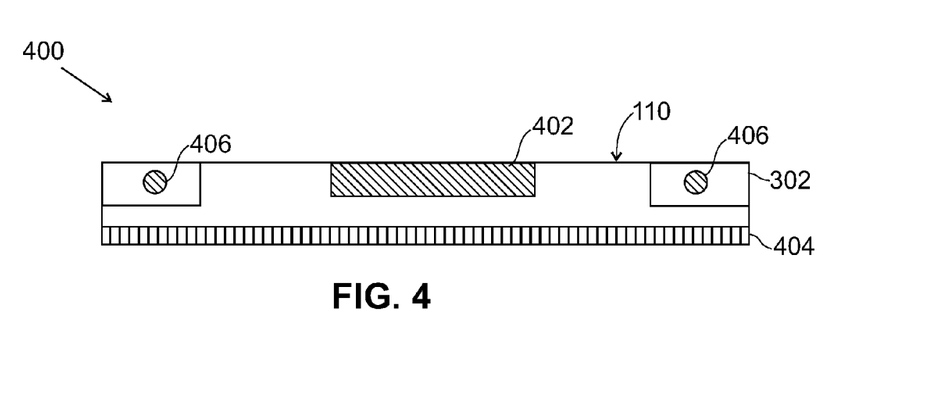
FIG. 4 is a schematic sectional view of the subcard taken along dotted line 4-4 of FIG. 3, as provided in accordance with aspects of the present invention.

FIG. 4 is an enlarged, schematic sectional view 400 of the contactless payment card 110 taken along dotted line 4-4 of FIG. 3. The card body 302 is again indicated in the drawing along with a shaded area 402 which represents the RFID chip 304 of FIG. 3, and shaded areas 406 which represents the antenna 306 shown in FIG. 3. In addition, a ferrite layer 404 is provided near the lower or rear or bottom surface of the card body 302 to provide the shielding function referred to above. In some embodiments, the ferrite layer 404 is applied before personalization occurs, whereas in some other embodiments the ferrite layer is applied after personalization occurs.

Referring again to FIG. 1A, the mobile telephone 102 contains a battery (not separately shown) and/or other electronic components that may tend to short out or otherwise interfere with the functioning of the antenna 306 (shown in FIG. 3) of the contactless payment card 110, and thus may tend to interfere with the overall operation of the contactless payment card 110. To aid in addressing this issue, the ferrite layer 404 (or a layer of other ferromagnetic material, which may be called a "shield layer") shown in FIG. 4 may be interposed between the body or housing of the mobile telephone 102 and the active components (the RFID chip 304 and the antenna 306) of the contactless payment card 110.

Figure 5:
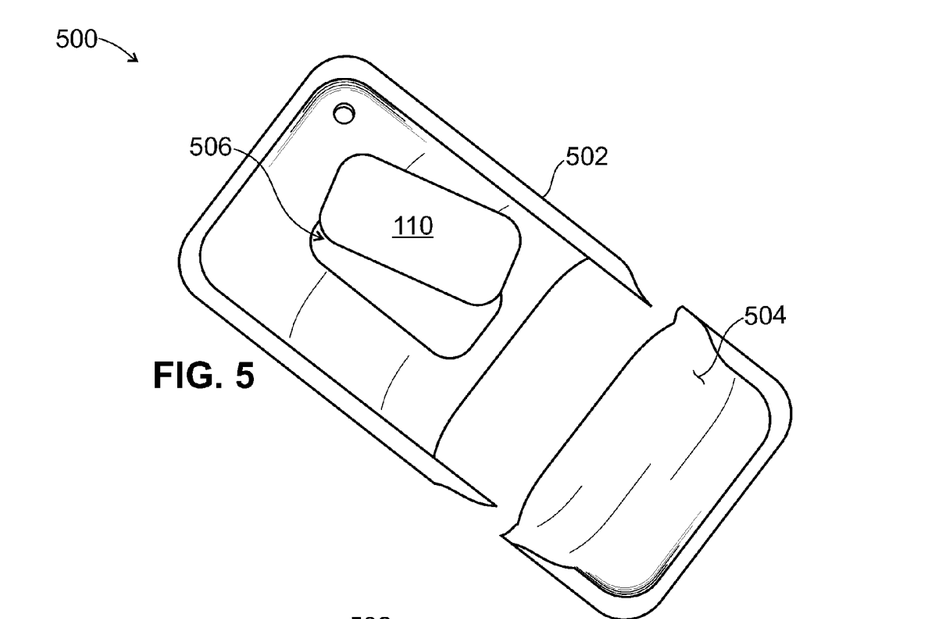
FIG. 5 shows a subcard being inserted into a carrying case in accordance with aspects of the present invention.

FIG. 5 shows an embodiment 500 of the components of a mobile device carrier assembly. In this embodiment, the carrying case includes a top portion 502 and a bottom portion 504, which two-part configuration facilitates connection to a mobile device. The top portion 502 includes an aperture 506, and the subcard 110 is shown being placed in the carrying case adjacent the aperture 506. As shown, the subcard 110 is oriented such that the ferrite layer 404 (located on the bottom surface of the subcard) is facing upwards (toward where the mobile device will be seated). The front surface of the subcard (which may include branding and personalization information printed thereon) is facing downwards towards the aperture 506. The aperture 506 may be customized so that it is sized or dimensioned to accommodate the dimensions of a particular type of IC identification card or subcard, and may include recessed edges or side ledge portions (not shown) sized to accommodate some or all of the peripheral edges or outer dimension edges of the IC identification card 110. In particular, the recessed edge portions of the aperture may be configured so that, when the subcard is fully inserted into the aperture, the back surface of the subcard lies flush (or substantially flush) with the inner surface of the top portion 502 of the carrying case.

It should also be understood that, when the IC identification card 110 is seated in the aperture 506, the printed material on the front surface is visible (or mainly or substantially visible) through the aperture 506 (so that it can be read by a consumer and/or merchant, for example). In addition, when the IC subcard 110 is seated in the aperture 506 and the carrier top portion 502 and subcard is fitted to the mobile device, the ferrite layer faces the mobile telephone and functions to shield the active electronic components of the subcard (such as the integrated circuit 304 and antenna 306 shown in FIG. 3) from the battery and/or electronic circuitry of the mobile device 102.

Figure 6:
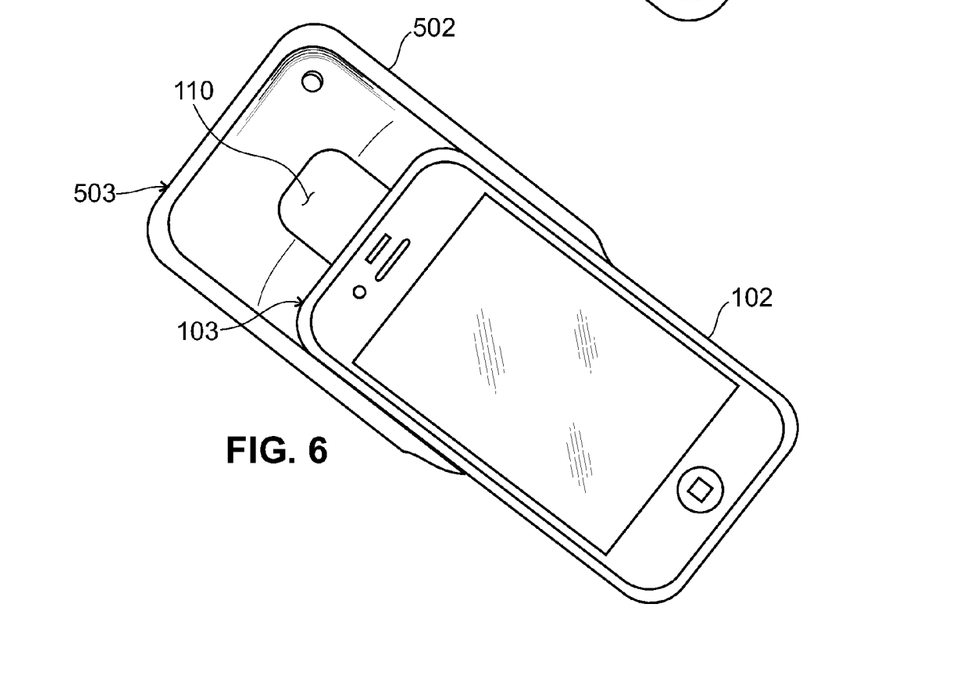
FIG. 6 shows a mobile telephone being inserted into the carrying case in such a manner as to secure the subcard within the carrying case according to aspects of the invention.

FIG. 6 shows the mobile telephone 102 being placed or inserted into the top portion 502 of the carrying case 104 in such a manner as to secure the subcard 110 in the carrying case. In particular, the top portion 502 of the carrying case may include rails (not shown) configured to slide within grooves in the mobile device, or that are configured for contacting an upper surface of the mobile device, to securely attach the top portion 502 to an upper portion of the mobile device 102. Alternately, or in addition to the rails, the carrying case may include tabs or other connectors that are configured to snap onto or otherwise attach to features found on the mobile device, to securely attach the top portion 502 to the upper portion of the mobile device. When the mobile device has been securely connected to the top portion 502 of the carrying case (such that the top edge 103 of the mobile device contacts an inside portion of a top wall 503 of the carrying case), the subcard 110 is securely held therein as it is sandwiched between the housing of the mobile telephone 102 and the carrying case top portion 502. As mentioned above, the ferrite layer of the subcard faces the mobile telephone, and in some embodiments is situated opposite a battery found in the mobile telephone, to provide a shielding function.

Figure 7:
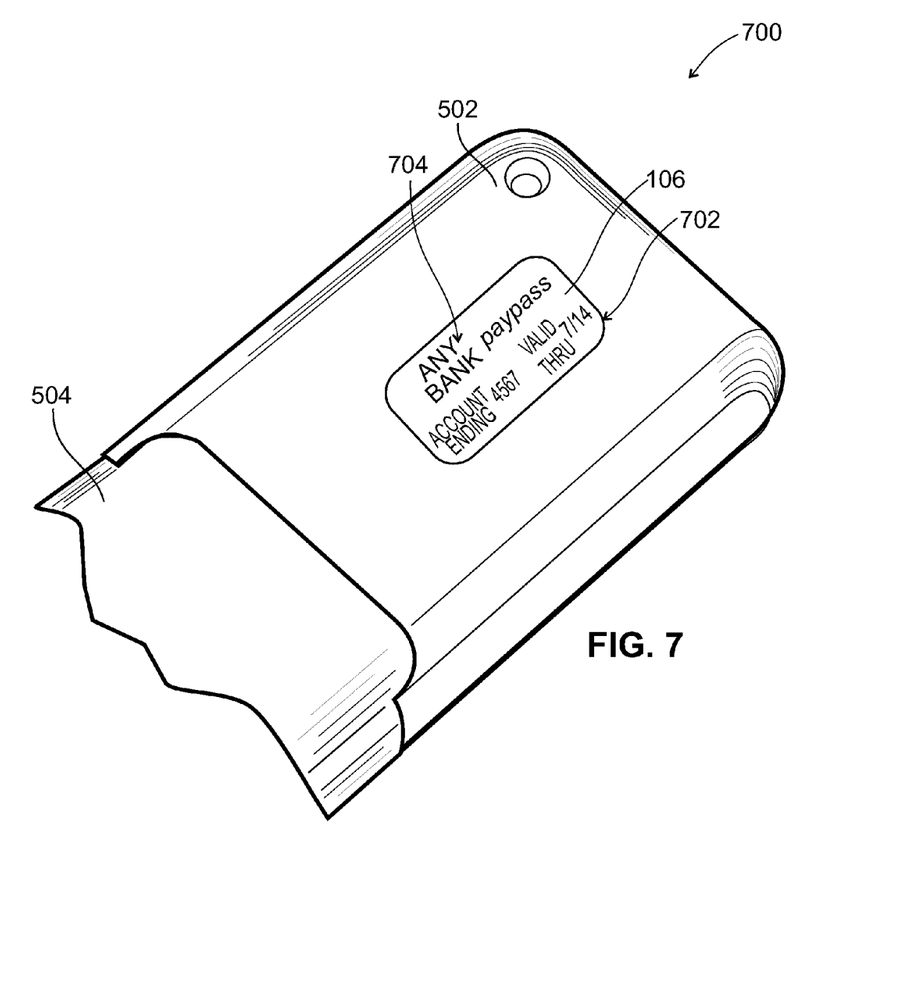
FIG. 7 is an enlarged, partial perspective view of an assembled, payment-enabled mobile device assembly as provided in accordance with aspects of the invention.

FIG. 7 is an enlarged, perspective view of a portion of a payment-enabled mobile telephone assembly 700 with the rear side of the top portion 502 of the carrying case visible. The aperture 506 permits the front side 702 of the subcard 110 (which may be referred to as the "branded side") to be visible and/or readable when in the carrying case, and in this example an "AnyBank" logo 704 and some additional payment card information is shown as visible through the aperture. In some embodiments, for example, the branded side of the subcard 110 may include printed or embossed information such as a credit or debit card account number (i.e., a financial account number), a brand name, a logo, a service mark, a trademark, a serial number, an expiration date, and/or other information and/or artwork. As shown, the mobile telephone is housed in the assembly behind the top portion 502, behind the bottom portion 504 (a portion of which is shown), and behind the subcard 110, but is essentially not visible in FIG. 7 because the front side of the mobile telephone (which includes a touch screen) is facing downwards.

The payment-enabled mobile telephone assembly 700 is now ready for use in a payment and/or purchase transaction. For example, the user (consumer) may take his or her mobile telephone, bearing the protective casing and the contactless payment card 110, with him or her while he or she visits a retail store. The consumer may make a selection of merchandise at the store and present the merchandise for purchase at a POS terminal in the store. After the sales clerk has entered the items to be purchased into the POS terminal (e.g., by scanning barcodes on the merchandise), the user effects payment for the transaction. This may be done, for example, by the user tapping the mobile telephone (for example, with the IC payment card 110 facing downwards) on the proximity reader component of the POS terminal. With the payment card thus or otherwise brought into proximity with the reader, wireless communications are exchanged between the payment card and the reader. In some embodiments, the user's payment card account number is communicated from the contactless payment card to the POS terminal via the reader and used to authorize and settle the purchase transaction.

Figure 8:
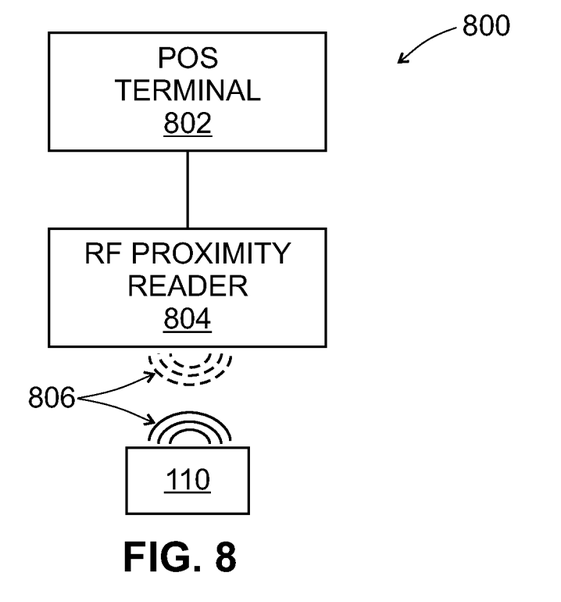
FIG. 8 schematically illustrates some communication aspects of a purchase transaction performed using the mobile telephone and identification card assembly according to the invention.

FIG. 8 is a schematic block diagram 800 that illustrates some communication aspects of the purchase transaction. The POS terminal is represented at block 802, and block 804 represents the proximity reader operably connected to or incorporated into the POS terminal 802. When the payment-enabled mobile telephone assembly 700 (FIG. 7) which includes the contactless payment card 110 is brought into proximity with the reader 804, the contactless payment card 110 wirelessly communicates 806 with the proximity reader 804 as indicated.

Figure 9:
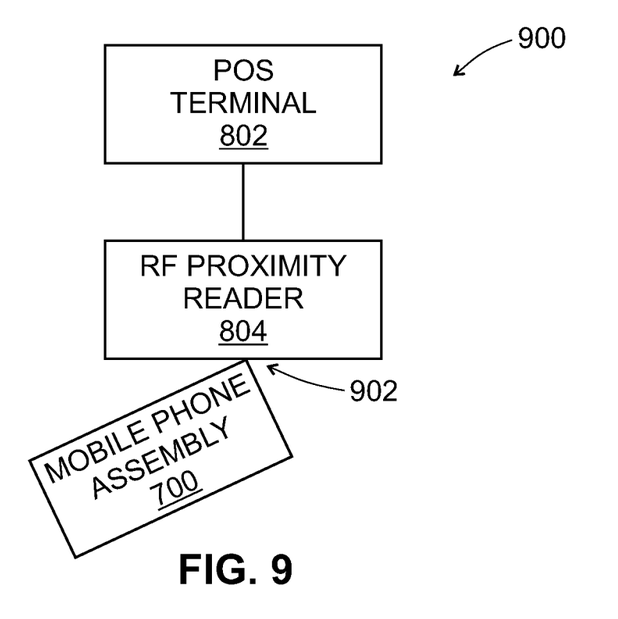
FIG. 9 schematically illustrates some physical aspects of the purchase transaction of FIG. 8 in accordance with aspects of the invention.

FIG. 9 is a schematic block diagram 900 that illustrates some physical aspects of the purchase transaction. As in FIG. 8, the POS terminal 802 and its associated proximity reader 804 are shown. A payment-enabled mobile telephone assembly 700, which includes a mobile phone 102 housed in a protective carrying case 104 along with a contactless payment card 110, is shown in proximity 902 to the proximity reader 804. In some embodiments the payment-enabled mobile telephone assembly 700 is physically tapped on the reader 804 to initiate communications and to engage in the purchase transaction.

Up to this point, the invention has been discussed in terms of IC identification cards or contactless payment cards used for purchase transactions. However, as mentioned above, the principles of the invention may be applied to, or may be applied in addition to, other types of contactless identification cards, such as those used to permit access to a transit system, or those used to identify participants in a customer loyalty system. In some embodiments, such cards may also utilize near-field communications (NFC), Bluetooth, and/or other types of communication protocols.

The above description presents the ferrite/shield layer 404 (FIG. 4) as formed directly on a back surface, or within the plastic body near the back surface, of the subcard 110. But in some embodiments the ferrite/shield layer may be put in place as part of a sticker that is adhered either to the back surface of the card body or that is adhered to a rear surface of the housing of the mobile telephone 102 at the locus where the subcard will be secured by the carrying case. The ferrite/shield layer could also be a flat panel structure that is sized and designed to fit within the aperture 506 (shown in FIG. 5, for example) and be held in place along with the subcard 110 when the mobile telephone 102 is inserted into the carrying case 502 as shown in FIG. 6. As mentioned above, the shield layer may be configured to prevent interference between the respective electrical components of the mobile phone or other electronic portable device and the components of the subcard (such as an RFID chip and/or an antenna).

The above descriptions and depictions of processes should not be considered to mandate a fixed order for performing process steps. Rather the steps may be performed in any order that is practicable.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An apparatus comprising:
   a carrying case configured for attachment to a portable electronic device, the carrying case having an aperture in a planar extent of a rear surface and sized for accepting outer dimension edges of an integrated circuit (IC) identification card;
   an IC identification card comprising a card body with a front surface having printed information thereon and a back surface, and having active electronic components; and
   a shield layer provided on the back surface of the IC identification card;
   wherein the outer dimension edges of the IC identification card are inserted into the aperture such that the shield layer on the back surface of the IC identification card lies substantially flush with an inner surface of the carrying case and at least a portion of the printed information on the front surface is visible through the aperture, and such that the shield layer shields the active electronic components of the IC identification card from electronic components of the portable electronic device.

2. The apparatus of claim 1, wherein the shield layer comprises a ferrite layer that is at least one of formed within the card body near the back surface, or formed on the back surface of the card body.

3. The apparatus of claim 1, wherein the shield layer comprises a ferrite layer that is part of a sticker adhered to the back surface of the card body.

4. The apparatus of claim 1, wherein the portable electronic device is at least one of a mobile telephone, a personal digital assistant, and a music player.

5. The apparatus of claim 1, wherein the IC identification card is a payment card.

6. The apparatus of claim 1, wherein the printed information on the front surface of the IC identification card includes at least one of a serial number, a logo, a brand name, a credit or debit card account number, a service mark, a trademark, a serial number, and an expiration date.

7. A method comprising:
   providing a carrying case configured for attachment to a portable electronic device, the carrying case having an aperture in a planar extent of a rear surface and sized for accepting outer dimension edges of an integrated circuit (IC) identification card;
   providing an IC identification card having a card body with a front surface having printed information thereon and a back surface, the IC identification card having active electronic components therein and a shield layer provided on the back surface;
   inserting the IC identification card into the aperture such that the shield layer on the back surface lies substantially flush with an inner surface of the carrying case and the printed information is visible through the aperture to form a carrying case and card holder assembly; and attaching a mobile device to the carrying case and card holder assembly such that the shield layer is between the active electronic components of the IC identification card and electronic components of the mobile device to form a payment enabled mobile device.

8. The method of claim 7, wherein the printed information on the front surface of the IC identification card includes at least one of a serial number, a logo, a brand name, a credit or debit card account number, a service mark, a trademark, a serial number, and an expiration date.

9. The method of claim 7, wherein providing the shield layer comprises at least one of forming a ferrite layer within the card body of the IC identification card near the back surface, or forming a ferrite layer on the back surface of the card body.

10. The method of claim 7, wherein providing the shield layer comprises adhering a sticker having a ferrite layer to the back surface of the card body.

11. The method of claim 7, wherein the mobile device is at least one of a mobile telephone, a personal digital assistant, and a music player.

12. The method of claim 7, wherein the IC identification card is a payment card.

* * * * *